United States Patent
Leal Rodriguez et al.

(10) Patent No.: US 12,049,142 B2
(45) Date of Patent: *Jul. 30, 2024

(54) BATTERY ARRAY MOUNTING AND SUPPORTING BRACKETS

(71) Applicant: FORD GLOBAL TECHNOLOGIES, LLC, Dearborn, MI (US)

(72) Inventors: Juan Carlos Leal Rodriguez, Southfield, MI (US); Suma Rani Das, Garden City, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 451 days.

This patent is subject to a terminal disclaimer.

(21) Appl. No.: 17/411,332

(22) Filed: Aug. 25, 2021

(65) Prior Publication Data

US 2021/0384578 A1 Dec. 9, 2021

Related U.S. Application Data

(63) Continuation of application No. 16/255,907, filed on Jan. 24, 2019, now Pat. No. 11,114,723.

(51) Int. Cl.
  *H01M 50/262* (2021.01)
  *B60L 50/60* (2019.01)
  *B60K 1/04* (2019.01)

(52) U.S. Cl.
  CPC .......... *B60L 50/66* (2019.02); *H01M 50/262* (2021.01); *B60K 1/04* (2013.01); *H01M 2220/20* (2013.01)

(58) Field of Classification Search
  None
  See application file for complete search history.

(56) References Cited

U.S. PATENT DOCUMENTS

| | | | |
|---|---|---|---|
| 8,980,456 B2 | 3/2015 | Insana et al. | |
| 9,321,337 B2 | 4/2016 | Wang et al. | |
| 10,128,474 B2 | 11/2018 | Ueda et al. | |
| 2010/0300784 A1* | 12/2010 | Bergmeier | B66F 9/07536 180/68.5 |
| 2017/0047563 A1 | 2/2017 | Lee et al. | |
| 2017/0237053 A1 | 8/2017 | Sugawara | |
| 2018/0269441 A1 | 9/2018 | Yum et al. | |
| 2018/0331334 A1 | 11/2018 | Lee et al. | |
| 2018/0342716 A1 | 11/2018 | Chu et al. | |
| 2019/0276081 A1* | 9/2019 | Otoguro | B60K 1/04 |

FOREIGN PATENT DOCUMENTS

| | | |
|---|---|---|
| JP | 2013-140694 A | 7/2013 |
| WO | 2017/123003 A1 | 7/2017 |

* cited by examiner

*Primary Examiner* — Jonathan Crepeau
(74) *Attorney, Agent, or Firm* — David B. Kelley; Carlson, Gaskey & Olds, P.C.

(57) ABSTRACT

Exemplary battery pack designs for use in electrified vehicles may include an enclosure assembly that houses one or more battery internal components. One or more brackets may be used to mount each of the battery internal components within the enclosure assembly. Each bracket may include at least one attachment point for securing the bracket to the enclosure assembly and at least two attachment points for securing the bracket to a support structure of the battery internal component. Fasteners may be received through the brackets and then into either the enclosure assembly or the support structure in order to mount the battery internal component inside the battery packs.

20 Claims, 4 Drawing Sheets

BATTERY ARRAY MOUNTING AND SUPPORTING BRACKETS

CROSS-REFERENCE TO RELATED APPLICATIONS

This disclosure is a continuation of U.S. application Ser. No. 16/255,907, filed on Jan. 24, 2019 and issued as U.S. Pat. No. 11,114,723, the entire disclosure of which is incorporated herein by reference.

TECHNICAL FIELD

This disclosure relates to electrified vehicle battery packs, and more particularly to brackets configured for mounting and supporting battery arrays or other components inside of battery packs.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. An enclosure assembly of the battery pack houses a plurality of battery internal components including, but not limited to, battery arrays and battery electronic components. The battery internal components are typically retained from movement inside the enclosure assembly.

SUMMARY

A battery pack according to an exemplary aspect of the present disclosure includes, among other things, an enclosure assembly, a component housed within the enclosure assembly, a bracket adapted to connect to both a support structure of the component and the enclosure assembly, a first fastener received through the bracket and into the enclosure assembly, and a second fastener received through the bracket and into the support structure.

In a further non-limiting embodiment of the foregoing battery pack, the component is a battery array.

In a further non-limiting embodiment of either of the foregoing battery packs, the first fastener is received through the bracket and into a tray of the enclosure assembly.

In a further non-limiting embodiment of any of the foregoing battery packs, the second fastener is received through the bracket and into an end plate or a side plate of the support structure.

In a further non-limiting embodiment of any of the foregoing battery packs, a third fastener is received through the bracket and into the support structure.

In a further non-limiting embodiment of any of the foregoing battery packs, the second fastener is received through a first mounting arm of the bracket and the third fastener is received through a second mounting arm of the bracket.

In a further non-limiting embodiment of any of the foregoing battery packs, the first fastener is received through a mounting base of the bracket.

In a further non-limiting embodiment of any of the foregoing battery packs, the bracket includes a mounting base, a wall section extending upwardly from the mounting base, and a mounting arm that extends outwardly and upwardly from the wall section.

In a further non-limiting embodiment of any of the foregoing battery packs, the first fastener is received through a first through-hole of the mounting base and the second fastener is received through a second through-hole of the mounting arm.

In a further non-limiting embodiment of any of the foregoing battery packs, the first through-hole and the second through-hole establish vertical attachment points of the bracket.

In a further non-limiting embodiment of any of the foregoing battery packs, a rib extends from the wall section to the mounting base.

In a further non-limiting embodiment of any of the foregoing battery packs, a window is formed in the wall section.

In a further non-limiting embodiment of any of the foregoing battery packs, at least one opening is formed in the wall section at a location that is outboard of the window.

In a further non-limiting embodiment of any of the foregoing battery packs, the bracket includes a mounting arm having a through-hole that aligns with a mounting hole of the support structure, and the second fastener is received through the through-hole and then into the mounting hole.

In a further non-limiting embodiment of any of the foregoing battery packs, the bracket is attached to a first end plate of the support structure, and a second bracket is attached to a second end plate of the support structure.

A method according to another exemplary aspect of the present disclosure includes, among other things, mounting a battery array to a component of an enclosure assembly of a battery pack with a bracket. The bracket includes at least one attachment point for securing the bracket to the component and at least two attachment points for securing the bracket to a support structure of the battery array.

In a further non-limiting embodiment of the foregoing method, mounting the battery array includes inserting a first fastener through the at last one attachment point, inserting a second fastener through a first of the at least two attachment points, and inserting a third fastener through a second of the at least two attachment points.

In a further non-limiting embodiment of either of the foregoing methods, the at least one attachment point and the at least two attachments points are established by vertically extending through-holes formed in the bracket.

In a further non-limiting embodiment of any of the foregoing methods, the component is a tray of the enclosure assembly, and the bracket is secured to an end plate of the support structure.

In a further non-limiting embodiment of any of the foregoing methods, the bracket includes a mounting base, a wall section extending upwardly from the mounting base, and a pair of mounting arms that extend outwardly and upwardly from opposing sides of the wall section.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery pack designs for use in electrified vehicles. Exemplary battery packs include an enclosure assembly that houses one or more battery internal components. One or more brackets may be used to mount each of the battery internal components within the enclosure assembly. Each bracket may include at least one attachment point for securing the bracket to the enclosure assembly and at least two attachment points for securing the bracket to a support structure of the battery internal component. Fasteners may be received through the brackets and then into either the enclosure assembly or the support structure in order to mount the battery internal component inside the battery packs. These and other features are discussed in greater detail in the following paragraphs of this detailed description.

Figure 1:
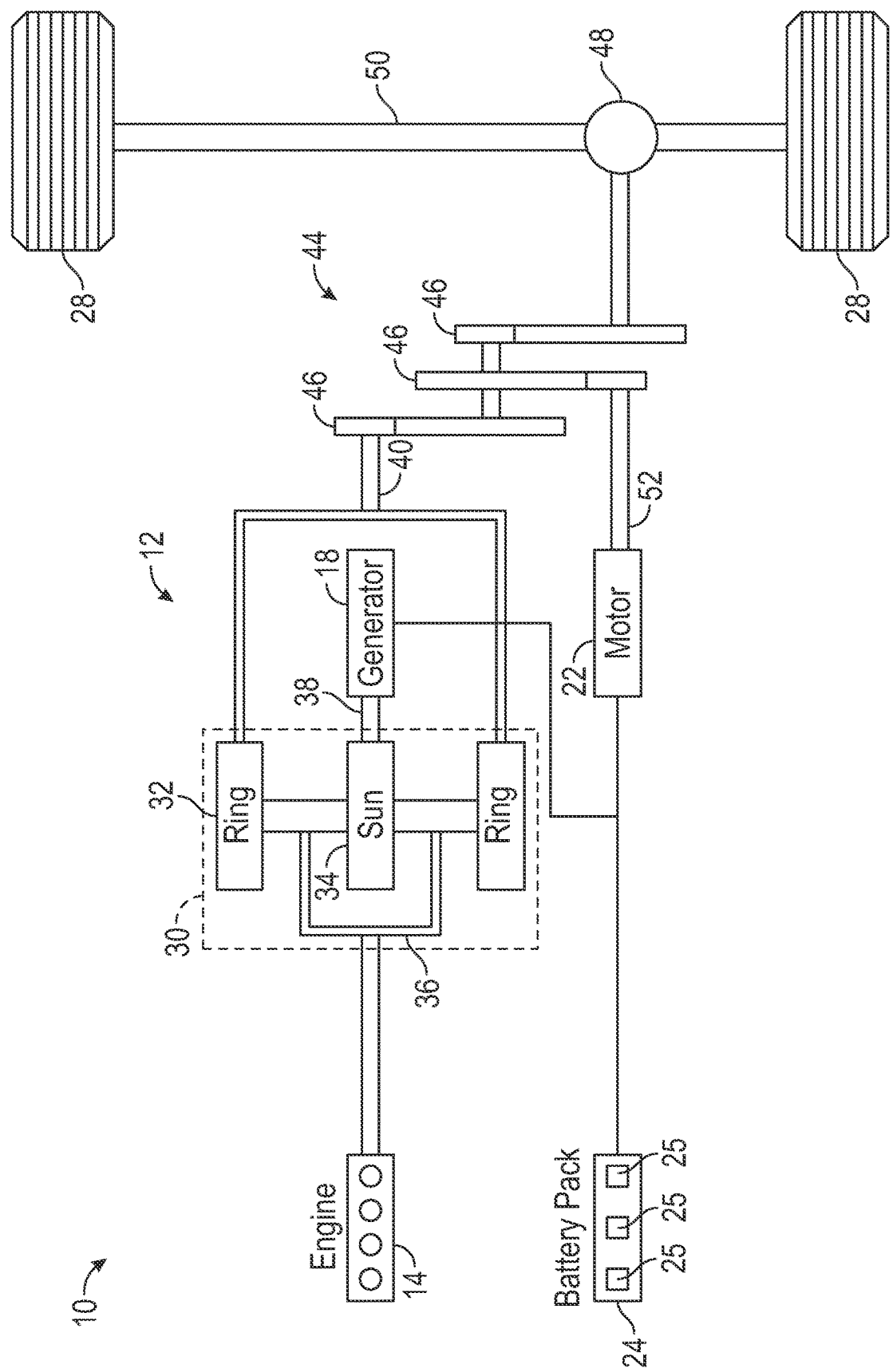
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery that includes a plurality of battery arrays 25 (i.e., battery assemblies or groupings of battery cells) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
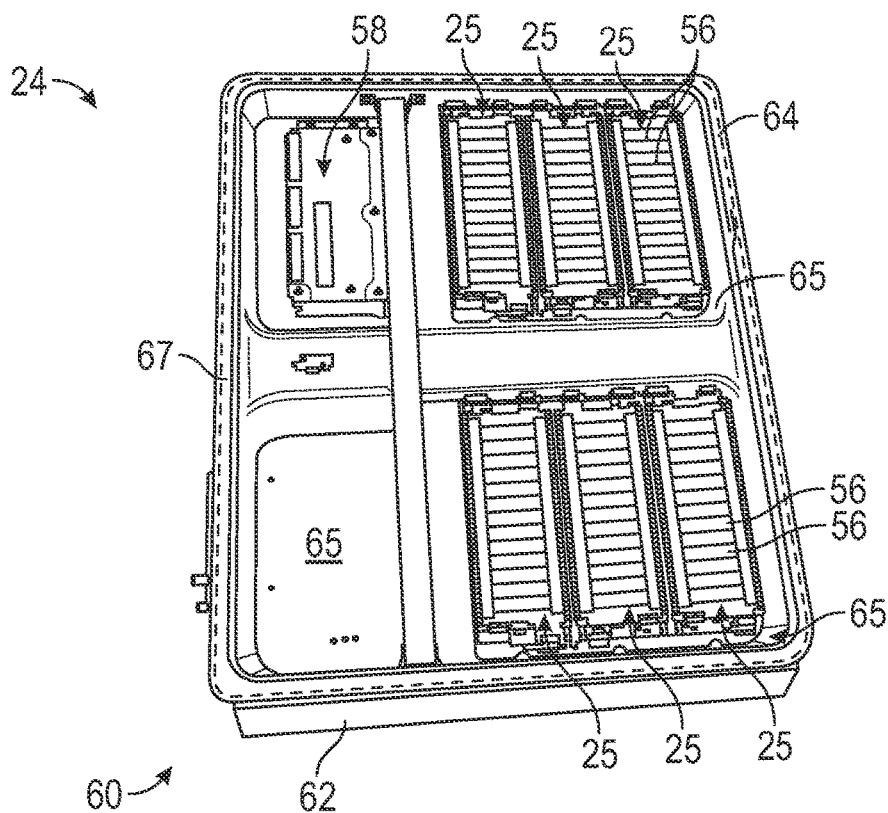
FIG. 2 illustrates a battery pack of an electrified vehicle.

FIG. 2 illustrates a battery pack 24 that can be employed within an electrified vehicle, such as the electrified vehicle 12 of FIG. 1. Portions of the battery pack 24 are shown in phantom (see, e.g., a cover 64) for better visualizing the internal contents of the battery pack 24.

The battery pack 24 may house a plurality of battery cells 56 that store energy for powering various electrical loads of the electrified vehicle 12. The battery pack 24 could employ any number of battery cells 56 within the scope of this disclosure. Accordingly, this disclosure is not limited to the exact configuration shown in FIG. 2.

The battery cells 56 may be stacked side-by-side along one or more stack axes to construct groupings of battery cells 56, sometimes referred to as "cell stacks" or "cell arrays." In an embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure. The battery cells 56 of each grouping, along with any support structures (e.g., array frames, spacers, rails, walls, plates, bindings, etc.), may collectively be referred to as a battery assembly or a battery array 25. The battery pack 24 depicted in FIG. 2 includes two sets of three laterally adjacent battery arrays 25 for a total of six battery arrays 25; however, the battery pack 24 could include a greater or fewer number of battery arrays and still fall within the scope of this disclosure.

The battery pack 24 may additionally house one or more battery electronic components 58. The battery electronic component 58 could include a bussed electrical center (BEC), a battery electric control module (BECM), wiring harnesses, wiring loops, I/O connectors, etc., or any combination of these battery electronic components.

An enclosure assembly 60 may house each battery array 25 and each battery electronic component 58 of the battery pack 24. Since the battery array 25 and the battery electronic components 58 are housed inside the enclosure assembly 60, these components may be referred to as battery internal components of the battery pack 24. The enclosure assembly 60 may include a tray 62 and a cover 64. The enclosure assembly 60 may include any size, shape, and configuration within the scope of this disclosure.

In an embodiment, the enclosure assembly 60 is a sealed enclosure. For example, during assembly, the battery internal components may be positioned within one or more pockets 65 formed in the tray 62, and the cover 64 may then be fixedly secured to a peripheral flange 67 of the tray 62 to seal the battery internal components therein.

Figure 3:
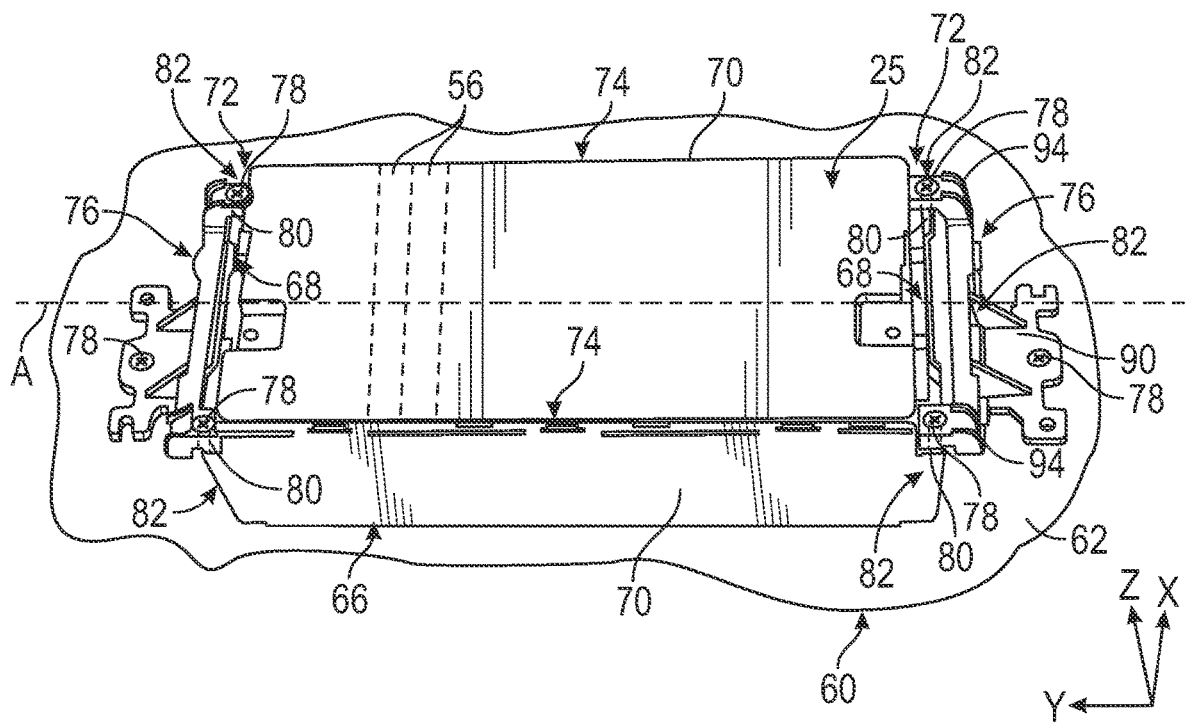
FIG. 3 illustrates a battery array of the battery pack of FIG. 2.

FIG. 3 illustrates a battery array 25 of the battery pack 24 of FIG. 2. The battery array 25 of FIG. 3 is representative of each of the battery arrays 25 of the battery pack 24 shown in FIG. 2.

The battery cells 56 of the battery array 25 may be supported by a support structure 66 that is disposed around an outer perimeter of the cell stack. In an embodiment, the support structure 66 includes pairs of end plates 68 and side plates 70 that cooperate to axially constrain the battery cells 56 in the stacked configuration.

In an embodiment, the battery array 25 includes one end plate 68 disposed at each longitudinal extent 72 of the battery array 25 and one side plate 70 connecting between the end plates 68 on each side 74 of the battery array 25. In this embodiment, the end plates 68 extend transversely relative to a longitudinal axis A of the battery array 25, and the side plates 70 extend in parallel with the longitudinal axis A. However, other configurations are also contemplated, and this disclosure is not limited to the specific battery array configurations shown in FIGS. 2-3.

One or more brackets 76 may be employed for mounting and supporting the battery array 25 relative to the enclosure assembly 60 of the battery pack 24. Only select portions of the battery assembly 60 are shown in FIG. 3. The brackets 76 are separate and distinct components from any portion of the support structure 66 of the battery array 25. Each of the brackets 76 may be mechanically secured to both the support structure 66 of the battery array 25 and to a portion (e.g., the tray 62) of the enclosure assembly 60 by a plurality of fasteners 78. In an embodiment, three fasteners 78 are used to secure each bracket 76 in place, although any number of fasteners could be utilized. The fasteners 78 may be screws, bolts, or any other mechanical fastener or combinations of mechanical fasteners.

In the embodiment shown in FIG. 3, one bracket 76 is mounted to each of the end plates 68 of the support structure 66 of the battery array 25 (see FIG. 3). For example, the end plates 68 may include mounting holes 80 that extend vertically (e.g., in the Z-axis direction) across at least a portion of the height of the end plates 68. The mounting holes 80 may be disposed within opposing side portions 82 of the end plates 68. In an embodiment, the opposing side portions 82 are disposed near a junction between each end plate 68 and each side plate 70. The fasteners 78 may be inserted through the bracket 76 and then into one of the mounting holes 80 for securing the bracket 76 directly to the end plate 68 of the support structure 66.

Figure 4:
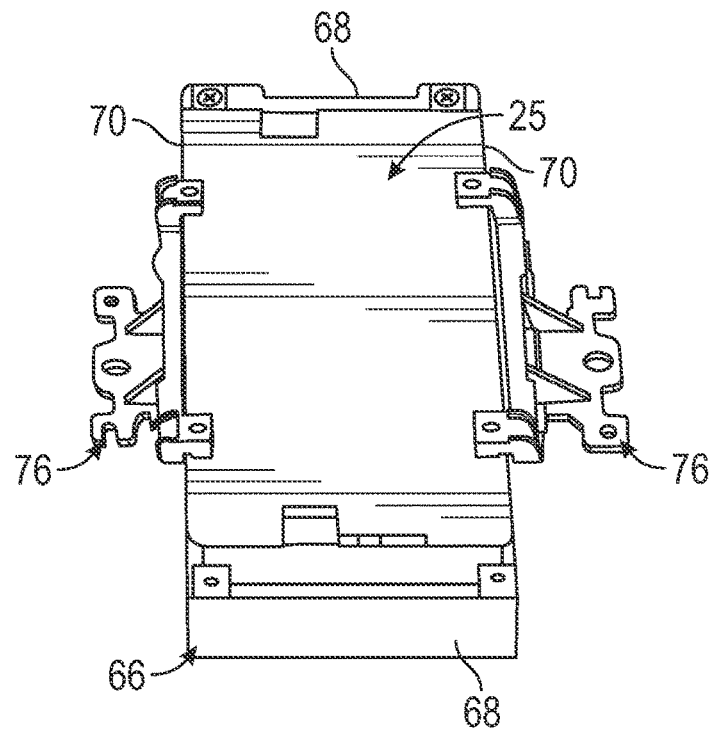
FIG. 4 illustrates another exemplary battery array.
Figure 5:
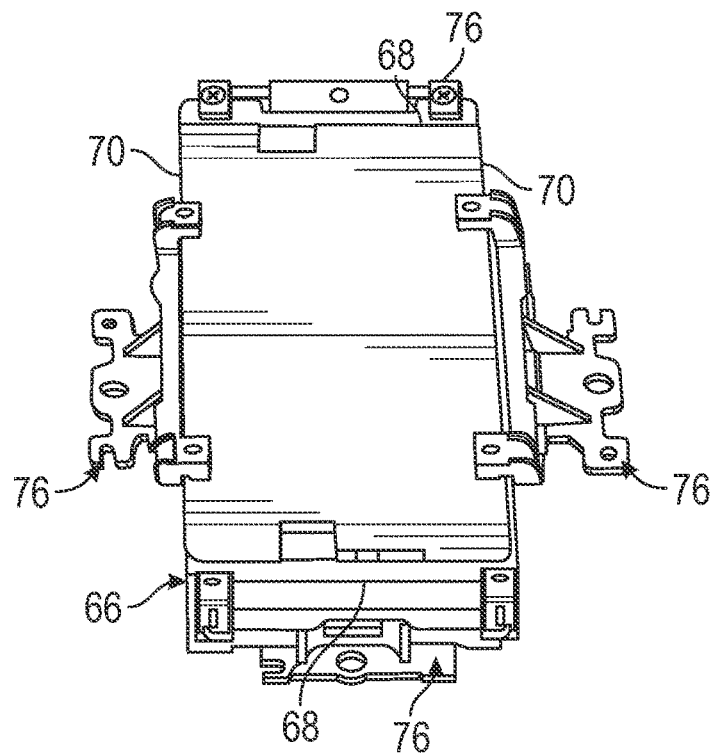
FIG. 5 illustrates yet another exemplary battery array.

In another embodiment, one or more brackets 76 may be mounted to each of the side plates 70 of the support structure 66 of the battery pack 24 (see embodiment of FIG. 4). In yet another embodiment, one or more brackets 76 may be mounted to each end plate 68 and to each side plate 70 of the support structure 66 of the battery array 25 (see embodiment of FIG. 5). Other bracket mounting locations could also be suitable and are therefore contemplated within the scope of this disclosure. The total number of brackets 76 utilized to mount and support the battery array 25 within the battery pack 24 is not intended to limit this disclosure.

Figure 6:
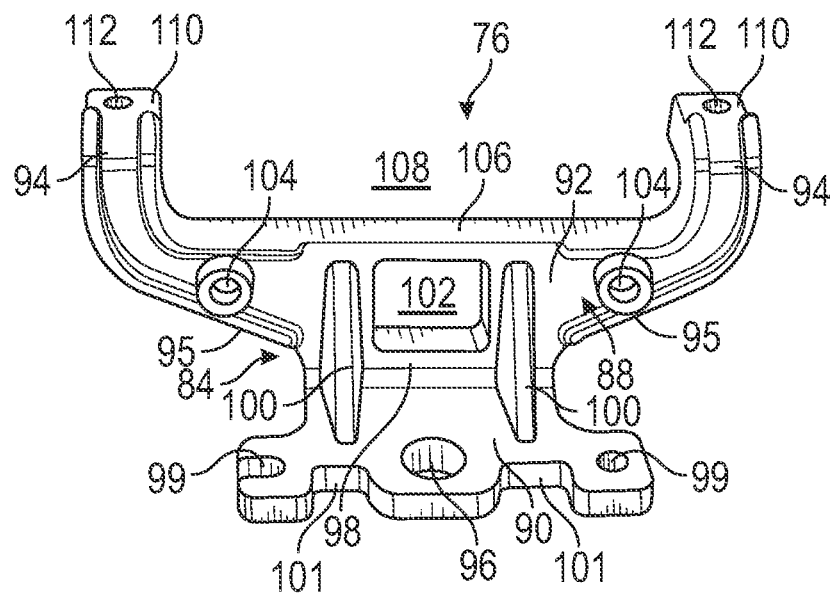
FIG. 6 is a front view of a bracket for mounting and supporting a battery array within a battery pack.
Figure 7:
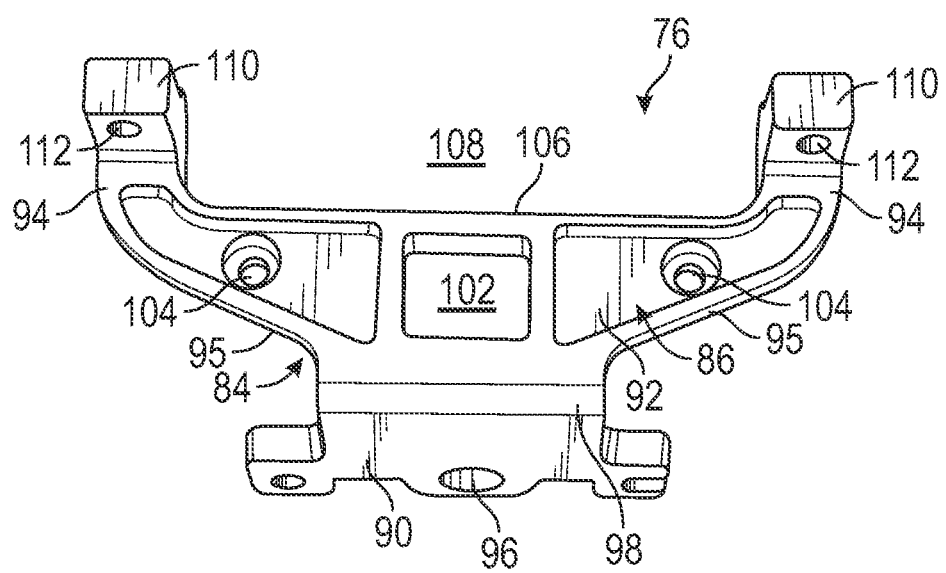
FIG. 7 is a rear view of the bracket of FIG. 6.

FIGS. 6 and 7, with continued reference to FIGS. 2-3, illustrate an exemplary design of the bracket 76. Although a specific bracket design is illustrated in these figures, the bracket 76 could incorporate various modifications and still fall within the scope of this disclosure so long as the bracket 76 provides vertical (e.g., Z-axis) attachment points for attachment to both the support structure 66 of the battery array 25 and the enclosure assembly 60 of the battery pack 24.

The bracket 76 may include a body 84 having an inner face 86 and an outer face 88. In a mounted position of the bracket 76, the inner face 86 faces toward the battery array 25 and the outer face 88 faces away from the battery array 25. In an embodiment, the body 84 of the bracket 76 is generally Y-shaped. However, other shapes are also contemplated within the scope of this disclosure.

The body 84 of the bracket 76 may include a mounting base 90, a wall section 92 extending upwardly from the mounting base 90, and mounting arms 94 that extend outwardly and upwardly from opposing sides 95 of the wall section 92. The body 84 may be a single-piece, monolithic component that includes each of the mounting base 90, the wall section 92, and the mounting arms 94.

The mounting base 90 may be relatively flat and is configured, in an embodiment, to rest atop the tray 62 of the enclosure assembly 60 of the battery pack 24 (see FIG. 3). The mounting base 90 may include a through-hole 96 configured to receive one of the fasteners 78 for mounting the bracket 76 to the tray 62. The through-hole 96 therefore establishes an attachment point for securing the mounting base 90 of the bracket 76 to another component (e.g., the tray 62 of the enclosure assembly 60). In an embodiment, the attachment point established by the through-hole 96 is a vertical, or Z-axis, attachment point. Of course, the mounting base 90 could be designed to include additional through-holes for establishing additional attachment points within the bracket 76.

Moreover, the mounting base 90 could include openings 99 for receiving locating pins or other components in order to secure the brackets 76 and the battery arrays 25 in place while avoiding contact with other components when lifting the battery arrays 25. The mounting base 90 may additionally include one or more cut-outs 101 for reducing the weight of the bracket 76.

The wall section 92 may extend upwardly from an inner edge 98 of the mounting base 90. Ribs 100 may extend diagonally between the wall section 92 and the mounting base 90 for structurally reinforcing and the strengthening the bracket 76.

The wall section 92 may additionally include a window 102 and one or more openings 104. The window 102 may be a cut-out portion that is disposed near a center of the wall section 92, and in an embodiment, is axially between the ribs 100 of that extend from the wall section 92. The window 102 may be used for lifting and handling the bracket 76 and for facilitating various electric connections through the bracket 76. The openings 104, which may be disposed outboard of the window 102, may provide the bracket 76 with additional packaging and electric connection options.

One mounting arm 94 may extend outwardly and upwardly from each opposing side 95 of the wall section 92. In an embodiment, the mounting arms 94 are curved arms. The mounting arms 94 may extend vertically above a top edge 106 of the wall section 92 such that an open pocket of space 108 extends laterally between the mounting arms 94. Providing the open pocket of space 108 substantially reduces the overall weight of the bracket 76.

Each mounting arm 94 may include a mounting tab 110 that juts inwardly from the inner face 86 of the body 84 of the bracket 76. The mounting tabs 110 may therefore extend further in a direction toward the battery array 25 in a mounted position of the bracket 76.

Each mounting tab 110 may include a through-hole 112 configured to receive one of the fasteners 78 for mounting the bracket 76 to the support structure 66 of the battery array 25. The through-holes 112 therefore establish attachment points for securing the mounting arms 94 of the bracket 76 to another component (e.g., the end plates 68 or side plates 70 of the support structure 66). In an embodiment, the attachment points established by the through-holes 112 are vertical, or Z-axis, attachment points. Of course, the mounting tabs 110 could be designed to include additional through-holes for establishing additional attachment points within the bracket 76.

In a mounted position of the bracket 76, the through-holes 112 of the mounting arms 94 may extend over top of and align with the mounting holes 80 of the end plates 68 or side plates 70 of the support structure 66 of the battery array 25. Fasteners 78 may be inserted through the through holes 112 and then into the mounting holes 80 for securing the bracket 76 to the battery array 25.

By virtue of the through-hole 96 and the through holes 112, the bracket 76 can provide at least three attachment points for securing the battery array 25 within the battery pack 24 using just three fasteners 78 (e.g., a first fastener through the mounting base 90, a second fastener through the first of the mounting arms 94, and a third fastener through the second of the mounting arms 94). The brackets 76 are therefore configured to facilitate relatively simple assembly and disassembly of the battery array 25 relative to the enclosure assembly 60 of the battery pack 24.

The bracket 76 may be constructed out of a metallic material. In an embodiment, the bracket 76 is a cast aluminum part. However, other manufacturing techniques and other materials or combinations of materials may be utilized to manufacture the bracket 76.

The exemplary battery packs of this disclosure incorporate unique bracket designs for mounting and supporting battery arrays inside the battery packs. The brackets can be utilized to support battery arrays of any design and for any vehicle application (i.e., BEV, PHEV, FHEV, mHEV, etc.). The brackets are lightweight, robust, and facilitate simple assembly and disassembly of battery arrays using a top-down approach that requires a limited number of mechanical fasteners.

This disclosure is not necessarily limited to mounting battery arrays. Other electric vehicle components could also be mounted using the brackets of this disclosure, including but not limited to any battery internal components.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
an enclosure assembly;
a component housed within the enclosure assembly;
a bracket adapted to connect to both a support structure of the component and the enclosure assembly,
wherein the bracket includes a pair of curved mounting arms, and the support structure includes a pair of end plates and a pair of side plates;
a first fastener received through the bracket and into the enclosure assembly; and
a second fastener received through a mounting tab of one of the curved mounting arms of the bracket and into a portion of the support structure.

2. The battery pack as recited in claim 1, wherein the component is a battery array.

3. The battery pack as recited in claim 1, wherein the first fastener is received through the bracket and into a tray of the enclosure assembly.

4. The battery pack as recited in claim 3, wherein the second fastener is received through the bracket and into one of the end plates or side plates of the support structure.

5. The battery pack as recited in claim 1, comprising a third fastener received through the bracket and into the portion of the support structure.

6. The battery pack as recited in claim 5, wherein the third fastener is received through another one of the curved mounting arms of the bracket.

7. The battery pack as recited in claim 1, wherein the first fastener is received through a mounting base of the bracket.

8. The battery pack as recited in claim 1, wherein the bracket includes a mounting base and a wall section extending upwardly from the mounting base, and further wherein the pair of curved mounting arms extend outwardly and upwardly in opposite directions from the wall section.

9. The battery pack as recited in claim 8, wherein the first fastener is received through a first through-hole of the mounting base, and the second fastener is received through a second through-hole of the one of the curved mounting arms.

10. The battery pack as recited in claim 9, wherein the first through-hole and the second through-hole establish vertical attachment points of the bracket.

11. The battery pack as recited in claim 8, comprising a rib that extends from the wall section to the mounting base.

12. The battery pack as recited in claim 8, comprising a window formed through the wall section.

13. The battery pack as recited in claim 12, comprising at least one opening formed in the wall section at a location that is outboard of the window.

14. The battery pack as recited in claim 1, wherein the one of the curved mounting arms of the bracket includes a through-hole that aligns with a mounting hole of the support structure, and the second fastener is received through the through-hole and then into the mounting hole.

15. The battery pack as recited in claim 1, wherein the bracket is attached to a first end plate of the pair of end plates of the support structure, and comprising a second bracket attached to a second end plate of the pair of end plates of the support structure.

16. The battery pack as recited in claim 1, wherein the bracket is attached to a first side plate of the pair of side plates of the support structure, and comprising a second bracket attached to a second side plate of the pair of side plates of the support structure.

17. The battery pack as recited in claim 1, wherein the bracket is attached to a first side plate of the pair of side plates of the support structure, and comprising a second bracket attached to a second side plate of the pair of side plates of the support structure, a third bracket attached to a first end plate of the pair of end plates of the support structure, and a fourth bracket attached to a second end plate of the pair of end plates of the support structure.

18. The battery pack as recited in claim 1, wherein the bracket includes an inner face that faces toward the component and an outer face that faces in a direction away from the component, and further wherein a mounting base of the bracket extends in a direction opposite from the component.

19. A battery pack, comprising:
an enclosure assembly;
a battery array housed within the enclosure assembly and including a plurality of battery cells and a support structure,
wherein the support structure includes a pair of end plates and a pair of side plates that cooperate to axially constrain the plurality of battery cells,
a bracket adapted to connect to portions of both the support structure and the enclosure assembly,
wherein the bracket includes a mounting base including a first through-hole that establishes a first attachment point of the bracket, a first curved mounting arm including a second through-hole that establishes a second attachment point of the bracket, and a second curved mounting arm including a third through-hole that establishes a third attachment point of the bracket;
a first fastener received through the first through-hole and into the enclosure assembly;
a second fastener received through the second through-hole and into a first end plate of the pair of end plates or a first side plate of the pair of side plates; and
a third fastener received through the third through-hole and into the first end plate or the first side plate.

20. The battery pack as recited in claim 19, wherein a body of the bracket is Y-shaped, and further wherein the second fastener is received through a mounting tab of the first curved mounting arm and the third fastener is received through a mounting tab of the second curved mounting arm.

* * * * *